Nov. 20, 1951     R. E. STUTZKE     2,575,475

SAFETY OVERLOAD CLUTCH

Filed Dec. 2, 1947

INVENTOR.
ROBERT E. STUTZKE
BY Arthur H Robert
ATTORNEY

Patented Nov. 20, 1951

2,575,475

UNITED STATES PATENT OFFICE 2,575,475

SAFETY OVERLOAD CLUTCH

Robert E. Stutzke, Louisville, Ky., assignor, by mesne assignments, to Minneapolis-Moline Company, a corporation of Minnesota Application December 2, 1947, Serial No. 789,243

8 Claims. (Cl. 64—28)

The present invention relates to power transmission devices embodying a safety clutch which prevents overloading of the driving shaft. In particular, it relates to a safety clutch in which the application of an overload to the driven shaft will automatically break the driving connection, and in which the driving connection will be automatically restored when the overload condition is eliminated.

It is an object of the present invention to provide a safety clutch in which releasable hydrostatic fluid pressure is employed to transmit power between the driving and driven elements.

A further object is the provision of a yieldable safety clutch in which the yielding of the drive connection is cushioned by a fluid.

Still another object is the provision of a yieldable hydrostatic transmission in which the yield point is predetermined in accordance with the hydraulic pressure.

In accordance with the present invention there is provided a housing carrying a fluid pump to rotate therewith, in which fluid is trapped in the compression chamber of the pump by means of a pressure releasable valve. The pump is engaged by a driving shaft so that the pump and the housing will be rotated thereby so long as the trapped pressure is held, and the housing rotates a driven shaft connected thereto. When a predetermined maximum trapped pressure is attained in the pump by reason of an overload on the driven shaft, the pressure is released so as to allow the driving shaft to rotate relative to the housing, and thus a yielding connection is established between the driving and driven shafts.

In a preferred embodiment of the invention the housing provides a pair of chambers or compartments separated by a dividing member which may be a piston operating in a cylinder, the cylinder serving as one of the compartments. The compartments are filled with a suitable fluid and are interconnected by a pair of passageways which have one way valves therein, and allow fluid to flow between the compartments upon movement of the dividing member. The load on the driven shaft resists turning of the housing, and the limit of fluid pressure in the cylinder is determined by the spring loading of one way valves in the passageways. If desired the dividing member may be biased in one direction by a spring. The dividing member is suitably connected to a driving shaft so that the torque of the shaft is delivered to the dividing member to compress the fluid in one compartment, and a driving connection is established when the fluid pressure and spring pressure on one side of the dividing member balance the force of the driving shaft on the other side. Should the load on the driven shaft become excessive the dividing member moves to allow the driving shaft to turn relative to the housing and break the driving connection, and thereupon the dividing member is returned by the spring in readiness for the next fluid compressing operating cycle of the driving shaft. This action is repeated as long as the overload condition persists.

The invention will be described in greater detail in connection with the accompanying drawing, wherein is illustrated a preferred embodiment of the invention by way of illustration, and wherein.

Figure 1:
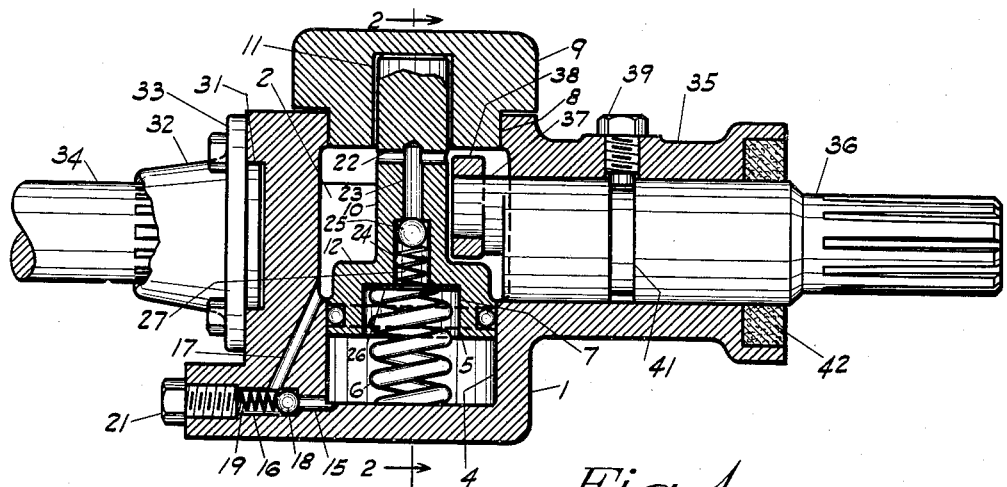
Figure 1 is a vertical sectional view of the invention.
Figure 2:
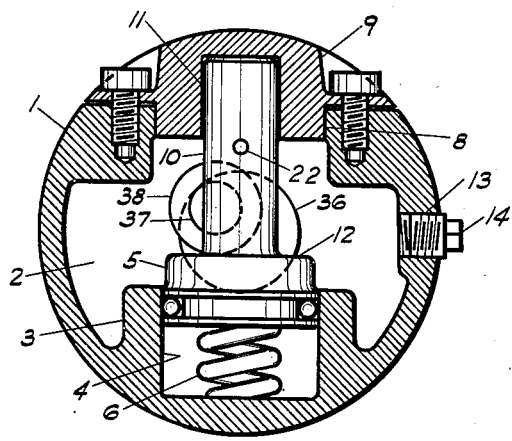
Figure 2 is a section taken on line 2—2 of Figure 1.

Referring to the drawing, Figure 1, there is shown a housing indicated generally at 1, which may be a forging or casting, and which is generally of flat hollow cylindrical form providing a chamber 2 therein. A boss 3 extending from the cylindrical wall is bored to provide a cylinder 4, and a piston indicated generally at 5 is received in the cylinder and thus divides the chamber into two compartments. The piston may be sealed with respect to the cylinder wall by any suitable type of packing ring, and a compression spring 6 engages the bottom wall of the cylinder and the top of recess 7 in the piston to bias the piston toward the center of the housing. The housing has a circumferential opening 8 which is closed by a cover 9 bolted or otherwise secured to the housing. Piston 5 has a stem 10 extending therefrom into a guide bore 11 in the cover, the stem and piston forming a shoulder 12 at their junction. The chamber 2 may be filled with a suitable fluid such as oil, through the opening 13, which is normally closed by a plug 14.

The housing has a passageway made up of bores 15, 16 and 17 which connect the cylinder 4 with the other compartment of chamber 2. The juncture of bores 15 and 16 provides a seat for a one way ball valve 18 resiliently held thereon by a helical spring 19 so as to resist the escape of fluid from the cylinder through the passageway, and prevent reverse flow therethrough. The end of bore 16 may be sealed by a cap screw 21 which also may serve as an abutment to engage one end of spring 19. The piston also has a passageway therethrough consisting of a cross bore 22 in the stem connecting with longitudinal bores 23 and 24. The juncture of bores 23 and 24 provides a seat for the one way ball valve 25. A washer 26 interposed between the spring 6 and the top of recess 7 provides one abutment for a helical spring 27 which resiliently holds the ball upon its seat to prevent escape of fluid from the cylinder through passageways 24, 23, 22, and allow the passage of fluid in a reverse direction therethrough. Thus, when piston 5 moves radially outward fluid in cylinder 4 flows through bores 15, 16 and 17 past the valve 18 into the chamber 2. When the piston moves radially inward, fluid flows from chamber 2 through bores 22, 23 and 24 past valve 25 into cylinder 4.

The end wall of the housing has a recess 31 which receives the socket member 32 held therein by a bolted flange 33 so as to be rotatable with the housing. The socket member may be internally splined to receive a complementary splined driven shaft 34 which is rotatable therewith. The other end wall of the housing has an integral sleeve 35 to rotatably receive a driving shaft 36, which may be the power take off shaft of a tractor or other suitable prime mover or source of power. The end of driving shaft 36 has an eccentrically located crank 37 with a rotatable bearing collar or bushing 38 thereon, the crank and collar being located so that they engage shoulder 12 of the piston. A stop pin 39 threaded through the sleeve 35 is received in a circumferential groove 41 in the shaft so as to retain the shaft against removal. As the shaft 36 enters the chamber 2, any suitable packing indicated at 42 may be provided to prevent leakage of fluid along the shaft.

The operation of the apparatus now will be described. The chamber 2 and cylinder 4 are filled with oil substantially free of air. Rotation of driving shaft 36 will carry crank 37 and its bushing 38 around into engagement with shoulder 12 of the piston 5. The load on driven shaft 34 connected to the housing will resist turning of the housing, and the hydrostatic pressure developed in cylinder 4 by the pressure of crank 37 upon piston 5 is limited or trapped by the setting of spring 19 of ball valve 18. The hydrostatic pressure is assisted by the action of spring 6 in resisting the pressure of crank 37 on the piston. When the pressure of the crank against the piston raises the hydrostatic pressure enough to open valve 18, some of the fluid escapes therethrough and the piston moves radially outward. Were it not for the spring 6, once the hydrostatic pressure opened valve 18 the flow of fluid therethrough would continue until the piston moved out of the path of the crank so as to allow the crank and shaft 36 to rotate in the housing 1, and the apparatus may be operated in this way by omitting the spring 6. However, as shown, as the fluid escapes through valve 18 and piston 5 moves outwardly, the compression of spring 6 increases until the reaction of the spring combined with the trapped hydrostatic pressure in cylinder 4 balance the force of the crank on the piston. Under balanced conditions the piston will not yield further, and a driving engagement will be established therethrough between the driving shaft 36 and housing 2. Under such conditions housing 2 will rotate in unison with driving shaft 36, and will rotate driven shaft 34 connected thereto.

Figure 3:
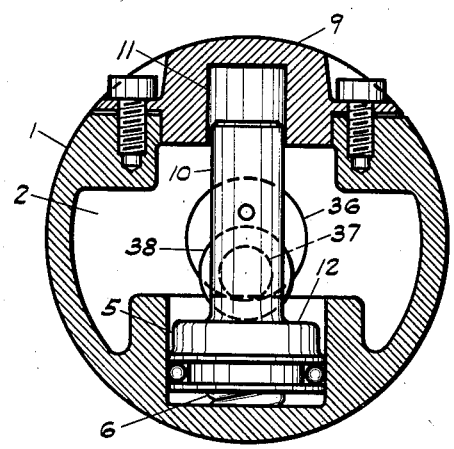
Figure 3 is a view similar to Figure 2 showing the invention in non-driving relation.

Any increase in load upon the driven shaft 34 will disarrange the condition of balance so that piston 5 will move outward to develop a greater compressive force in spring 6 to restore the condition of balance for driving engagement, this movement being accompanied by escape of fluid from the cylinder through valve 18. However, should the load on driven shaft 34 become excessive, the piston 5 will yield so far that crank 37 can pass the piston as shown in Figure 3, thus breaking the driving engagement. After the crank passes dead center the piston will be moved radially inward by the spring 6 and ball valve 25 will yield to allow fluid to flow past this valve into the cylinder. The return movement of the piston thus is cushioned by the fluid flow through valve 25, so as to avoid pounding and noise. If by the time crank 37 again comes into engagement with the piston the overload condition has been eliminated, a driving connection under conditions of balance will be reestablished. However, if the overload condition still exists, the crank will again depress and pass the piston. This passing action will continue until the overload condition is eliminated. Because piston 5 is free to turn in cylinder 4, and sleeve 38 is free to turn on crank 37, wear between these parts will be evenly distributed.

In the modification shown, only one eccentric pin and one piston are shown, but it is to be understood that any desired number of such pistons and their cylinders with fluid passages connected to the chamber may be employed. The pistons may be uniformly distributed about the housing, and if desired, may be connected rigidly in opposed pairs by suitable slotted yokes. Especially, where one or more connected pairs of opposed pistons are employed, the spring 6 may be omitted, in which case the spring loading on escape valve 18 in each will determine the yielding load on the piston and the yielding movement of the opposed piston in engagement with the crank will move the other piston radially inward. Various other modifications may be made in the invention without departing from the spirit or scope thereof.

Having described my invention, I claim:

1. An overload safety clutch comprising a housing adapted to receive a driven shaft connected thereto to rotate therewith; a pump carried by said housing operable transverse to the axis of rotation of the housing and having a compression chamber provided with fluid inlet and outlet passageways; pressure responsive valve means for resisting the escape of fluid from said outlet passageway; and means in said housing operable by a driving shaft for operating said pump.

2. An overload safety clutch comprising a housing forming a chamber adapted to contain a fluid; means for coupling a driven shaft thereto; displaceable means movable transverse to the axis of the driven shaft dividing said chamber into compartments; passageways connecting said compartments for allowing flow of fluid therebetween; one way valve means in said passageways for allowing the flow of fluid in one direction and preventing reverse flow; a driving shaft rotatably journalled in said housing in alignment with the driven shaft; an eccentric rotatable in said housing and engaging said displaceable means; and a driving shaft to rotate said eccentric for engaging said displaceable means to apply pressure to the fluid in one compartment.

3. An overload safety clutch comprising a housing forming a chamber adapted to contain a fluid and adapted to receive a driven shaft rotatable therewith; displaceable means dividing said chamber into compartments; a passageway in said means connecting said compartments; one way valve means in said passageway; a second passageway in the housing wall connecting said compartments; a one way valve means in said second passageway, said valve means being arranged to allow circulation of fluid in one direction between said compartments; a journal in said housing for rotatably receiving a driving shaft; and an eccentric operated by said shaft for operating said displaceable means.

4. An overload safety clutch comprising a housing forming a chamber adapted to contain a fluid and adapted to receive a driven shaft rotatable therewith; said housing having an internal boss providing a cylinder; a piston reciprocable in said cylinder; a passageway through said piston having a one way valve therein; a passageway through said boss having a one way valve therein, said valves being arranged to allow circulation of fluid in one direction between said chamber and cylinder; a driving shaft rotatably journalled in said casing; means retaining said shaft against removal; an eccentric on said shaft for engaging said piston; and a spring biasing said piston in one direction.

5. An apparatus as specified in claim 4 wherein said housing has an opening sealed by a cover having a guide bore therein, and said piston has a stem receivable in said guide bore.

6. An apparatus as specified in claim 4 wherein said piston is rotatable in said cylinder, and said eccentric rotatably carries a sleeve which engages said piston.

7. An overload safety clutch comprising: a housing forming a chamber adapted to contain a fluid, said housing being adapted to receive a driven shaft rotatable therewith; displaceable means dividing said chamber into compartments; valved passageways connecting said compartments for allowing circulation of fluid therethrough in one direction; and an eccentric member in said housing rotatable on an axis transverse to the direction of displacement of said means and biased against said means by a rotatable driving shaft, whereby the resistance to displacement of said means establishes a yieldable driving connection between said shafts.

8. An overload safety clutch comprising: a housing carrying a coupling for attachment of a driven shaft and having a socket for reception of a driving shaft in alignment with the driven shaft, said housing providing a chamber adapted to contain a fluid; a member displaceable in a direction transverse to the axis of said driving shaft dividing said chamber into compartments; valved passageways connecting said compartments for allowing circulation of fluid through said compartments in one direction; and a member operated by the driving shaft engaging said displaceable member and reciprocable transverse to the driving shaft, whereby the resistance to displacement of said displaceable member establishes a yieldable driving connection between the driving shaft and housing.

ROBERT E. STUTZKE.

REFERENCES CITED

The following references are of record in the file of this patent:

UNITED STATES PATENTS

| Number | Name | Date |
|---|---|---|
| 2,293,787 | Worden | Aug. 25, 1942 |